Sept. 9, 1952 B. G. STALHEIM 2,609,812
MEANS FOR SAWING STONE SUCH AS MARBLE AND THE LIKE
Filed July 11, 1949 2 SHEETS—SHEET 1
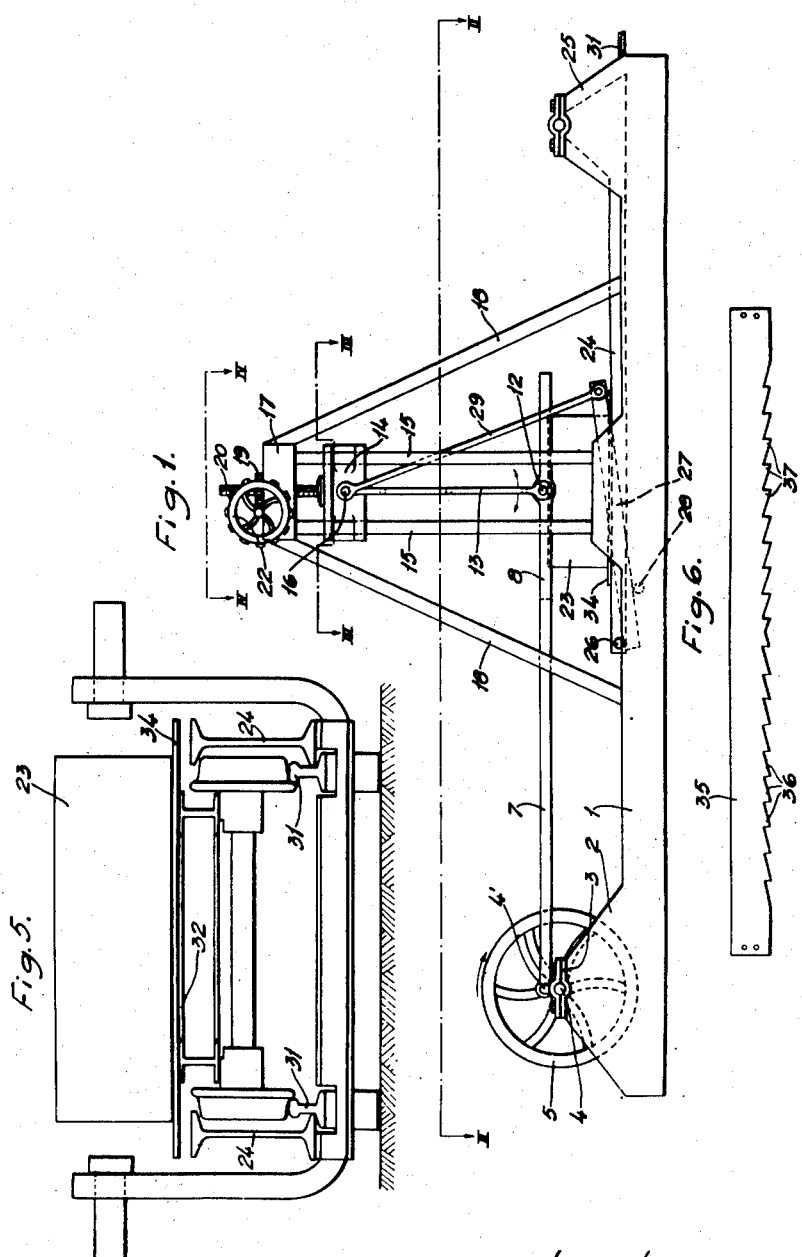
Inventor:
Bror G. Stålheim Sept. 9, 1952  B. G. STALHEIM  2,609,812
MEANS FOR SAWING STONE SUCH AS MARBLE AND THE LIKE
Filed July 11, 1949  2 SHEETS—SHEET 2
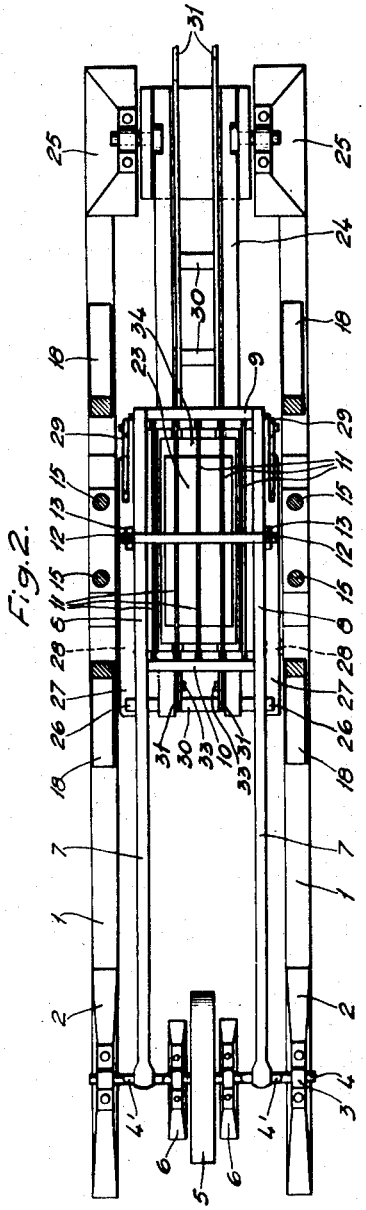
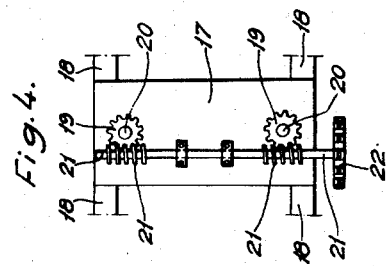
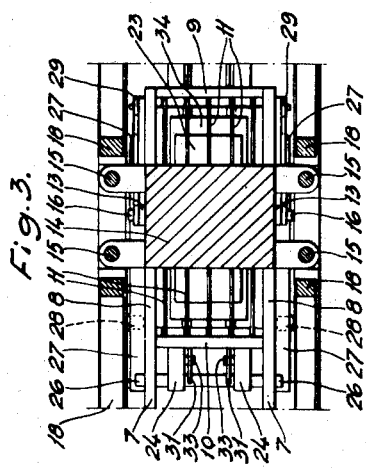
Inventor:
Bror G. Stalheim Patented Sept. 9, 1952

2,609,812

UNITED STATES PATENT OFFICE 2,609,812

MEANS FOR SAWING STONE SUCH AS MARBLE AND THE LIKE

Bror G. Stålheim, Stockholm, Sweden, assignor to Dreier-Stalheim Inc., New York, N. Y., a corporation of New York Application July 11, 1949, Serial No. 103,977
In Sweden March 18, 1948

8 Claims. (Cl. 125—19)

My invention relates to a method and as well as means for sawing stone blocks of every kind, particularly marble, and the main object of my invention is to facilitate the operation and reduce the time necessary for carrying out same and consequently the costs connected with such sawing. Another object of my invention is to provide means for carrying out said improved method in a suitable manner.

For the process according to my invention I use a rectangular saw frame having one, or more parallel saw blades stretched in the longitudinal direction thereof and the main characteristics of my method are that the saw frame simultaneously with a reciprocating movement is caused to perform a rocking movement about an axis perpendicular to the side surfaces of the saw blades, which axis substantially coincides with an imagined line extending transversally between the middle points of the two opposite longitudinal side members of the saw frame, and that, when the saw frame is moved in either direction, its front portion, calculated in the direction of movement, is lowered towards the block so that the corresponding portion of the saw blades work upon said block, while the rear portion of the saw frame, still calculated in the direction of movement, is lifted up from the block.

My method may be carried out by using normal saw blades without teeth, previously known in the art of stone sawing, but I prefer to use toothed saw blades, each of which has a number of teeth divided into two groups located on either side of the rocking axis, the teeth of each group being directed outwardly from the rocking axis towards the adjacent end of the saw blade.

A sawing plant for carrying out my method will be more closely explained in the following text, reference being had therein to the accompanying drawings, in which:

Fig. 1 is a side view of the plant,

Fig. 2 is a plan view along the line II—II in Fig. 1,

Fig. 3 is a partial plan view along the line III—III in Fig. 1,

Fig. 4 shows a partial plan view along the line IV—IV in Fig. 1 viewed from above and Fig. 5 is a vertical section of the plant showing a preferred embodiment of the block transport means.

Fig. 6 shows a saw blade according to the invention.

The plant comprises two longitudinal members 1, which at one end thereof are provided with supports 2 and bearings 3 for a crank shaft 4 being provided with a fly or strap wheel 5. The crank shaft is furthermore journalled in two additional supports 6 located on either side of the fly wheel 5, the latter serving only as auxiliary supports for the crank shaft. On the crank webs $4^1$, which extend in the same direction, are journalled the ends of two parallel, cooperating connecting rods 7, running into longitudinal side members 8 of a saw frame, the short sides of which are constituted by end pieces 9 and 10 forming a transversal connection between the longitudinal side members 8. Saw blades 11 are stretched between the end pieces 9 and 10 in the usual manner, so as to parallel the side members 8 of the saw frame. During the rotation of the crank shaft 4, accordingly the saw frame primarily will be caused to execute a reciprocating movement in the longitudinal direction of the plant. In the middle point between the end pieces 9 and 10 the side members 8 are provided with outwardly projecting pins 12 on which link rods 13 carrying the saw frame are journalled. The link rods 13 are interconnected so as to move uniformly. These link rods extend upwardly to a slide block 14, which is vertically slidable along standards 15, and the upper ends of the link rods 13 are journalled on pivots 16 on the slide block so that the saw frame may swing as a pendulum. At the top of the standards 15 there is provided a top block 17 receiving the upper ends of the standards and supported by riders 18. At the upper side of the top block are two worm gear arrangements, the worm wheels 19 of which embrace and engage by internal threads threaded columns 20 rigidly connected to the slide block 14. Said threaded columns 20 pass freely through holes in the top block, and at the rotation of the worm wheels 19 they will be moved in the vertical direction, thereby driving the slide block accordingly and thus effecting vertical adjustment of the saw frame. The teeth of the worm wheels 19 are engaged by worm gears 21 mounted on the top block 17 and adapted to be mechanically or manually operated for instance via a chain wheel 22.

The arrangement hitherto described will permit proper sawing of a marble block 23 or the like put under the saw frame when the saw-frame is slowly lowered during rotation of the crank shaft 4, and the saw frame will execute a movement as previously described herein.

However, it has proved still more suitable to provide means also for elevating the marble block 23 during the sawing, simultaneously with the lowering of the saw frame.

Therefore, I provide a bridge 24 for carrying the marble block, and this bridge is swingably mounted at its one end to a bracket 25 located on each longitudinal member 1 at the end of the plant opposite to that of the crank shaft 4. The bridge 24 extends under the saw frame and the top block 17, and the inner end thereof has lateral projections 26, which cooperate with the one end of a lever 27 on each side of the bridge 24. Said levers 27 are swingably resting on pivot brackets 28 on the longitudinal members 1, and the other ends thereof are hingedly connected to the lower ends of two parallel push rods 29, the upper ends of which are swingably connected to the pivots 16 on the sliding block 14 previously described. By lowering the sliding block 14, an elevation of the inner end of the bridge 24 is thus effected simultaneously with the lowering of the saw frame, and the marble block 23 will be clamped as between two jaws. It may be pointed out that if the marble block is elevated towards the saw frame during the sawing, it is not quite necessary to have or make use of any means for lowering the saw frame. In such a case proper sawing may take place under substantially the same conditions as if the saw frame only were vertically adjustable, but in fact a double action gives a better result, since the bottommost part of the stone block remaining uncut and thus inerconnecting the plates when the sawing is finished, may be reduced to a minimum and the block may be kept in a more suitable position throughout the whole operation.

As marble blocks of such a size for which the plant is intended are heavy and very difficult to handle, it has been found suitable to provide means for placing the marble block in proper position in the saw plant and for transporting the block to and from this position. Therefore, I prefer to make up the bridge 24 of two longitudinal and parallel I-beams interconnected at the lower side by transverse pieces 30 and to place two parallel rails 31 therebetween so as to provide a railway for a truck 32, on which the marble block 23 can be put. The rails 31 are supported by plinths 33, which protrude over the transverse pieces 30 of the bridge 24, when the bridge is in its lowermost position. The truck 32 has a platform 34, the width of which is greater than the space between the I-beams of the bridge, and on this platform the marble block 23 is placed and secured in a suitable manner for instance by concrete casting. When the bridge 24 is lowered sufficiently to permit the rails 31 to rest on the plinths 33, the platform 34 of the truck 32 will pass freely above the I-beams, when the truck is pushed into the plant, but when the bridge 24 is elevated at its inner end as hereinbefore described, the I-beams will engage the platform 34 and lift it, since the rails at the same time sink down so as to rest on the upper side of the transverse pieces 30 of the bridge and with their heads engage the lower flange of the I-beams. When properly supported by the bridge 24 the platform 34 may be clamped or otherwise secured thereto, and the sawing may take place in the manner described. Of course, the detachment of the truck and the block may be carried out in reverse order.

As will be readily understood by every technician, the saw frame 8, 9, 10 with its saw blades 11 will execute a reciprocating movement and simultaneously a rocking movement, when the crank shaft 4 is rotated. The axis of the rocking movement will coincide with the centre line of the two pins 12, and the fore end of the saw frame viewed in the moving direction, will always be lowered towards the marble block, while its rear end is elevated, due to the effect of the cranks on the crank shaft 4.

Although normal saw blades without teeth may be used with a good result in the plant, the efficiency thereof will be much increased by using saw blades of a particular kind being designed for that purpose. A saw blade of such a kind is shown in Fig. 6. This blade comprises a body 35 preferably of steel and has teeth 36 and 37 preferably of hard metal or other hard material. The teeth of the blade are divided into two groups occupying one end each of the blade, and the teeth in either group are directed towards the respective end of the blade, i. e. commonly the adjacent end thereof. When such a saw blade is used for carrying out my method in my plant it is obvious that only one tooth group at a time will engage and cut the marble block during the moving of the saw frame, and the direction of the teeth in this group always corresponds to the moving direction of the frame. The idle group of teeth is lifted up from the block and thus protected against any wear and breakage.

It may be mentioned that a sawing plant substantially of the kind hereinbefore described has given the most remarkable results as regards the time necessary for sawing up a normal marble block. Thus it has been hitherto found possible to use a velocity of approach between the saw frame and the marble block i. e. the velocity at which the block is sawn through of about 35–40 inches per hour and still more remarkable results are expected.

Although my invention is particularly described with reference to the embodiment shown in the accompanying drawings, it is obvious that many variations may be made in designing the plant without any deviation from the inventive idea. Any man skilled in the art will also be able to arrange the plant in agreement with the demands for sawing any other natural or artificial stone than marble.

Of course it is possible for instance to use one or more as well as two connecting rods between the crank shaft and the saw frame and to arrange the cranks of the crank shaft at the ends thereof so that roller bearings may be used for the crank shaft. Automatic and compulsory adjustment of the sliding block during the sawing is preferred and may be obtained without particular instructions and also without any inventive effort.

Having now described my invention and the manner in which it is to be performed, I claim:

1. In a stone sawing machine the combination of a work carrying bridge, means for elevating said bridge, standards on each side of said bridge, a cross member connecting the upper portions of said standards above and transversely to said bridge, parallel link rods suspended from said cross member, a saw sash rockably mounted at the lower ends of said link rods, a rigid arm extending longitudinally from said sash and having its outer end pivotally connected to a crank imparting, when operated, a reciprocating and rocking motion to said sash, and toothed saw blades parallelly mounted and stretched in said saw sash, said saw blades having raked teeth divided into two groups occupying each one end portion of each saw blade, the teeth of either such group raking towards the respective end of each saw blade.

2. In a stone sawing machine the combination of a work table, means for elevating said table, a frame structure transversing above said table, two single parallel link rods swingably suspended from said frame structure, one on each side of said work table, a substantially horizontal saw sash arranged above said table and suspended in said link rods, said link rods having their lower ends pivotally connected to opposite longitudinal sides of said sash and substantially at the middle of the length of said sash, a rigid arm of substantial length extending longitudinally from said sash and having its free end pivotally connected to a crank imparting, when rotated, a longitudinally reciprocating and rocking motion to said sash, and toothed saw blades parallelly mounted and stretched in said sash, each of said saw blades having two groups of raked hard metal teeth, each of said groups extending from the center substantially to an end of the related blade, the teeth in each group raking towards its respective end of said saw blade.

3. In a stone sawing machine, the combination of work carrying means, blade supporting means disposed above said work carrying means, toothed saw blades mounted parallelly in said blade supporting means, each of said blades having raked teeth extending along the lower edge thereof and divided into two groups, the teeth in one of said groups being oppositely raked relative to the teeth in the other of said groups, and means for reciprocating said blade supporting means parallel to said blades and for simultaneously rocking said blade supporting means about an axis substantially vertically aligned with the centers of said lower edges of the blades, the last mentioned means being operative to rock said blade supporting means so that, during a reciprocating stroke thereof, the end portion of each of said blades, having teeth raked in the direction of said stroke, is lowered, while the other end portion of each of said blades is elevated.

4. In a stone sawing machine, the combination according to claim 3; including means for effecting relative vertical feeding movement of said blade supporting and work carrying means.

5. In a stone sawing machine, the combination according to claim 3; wherein the teeth in each of said groups are raked in the direction toward the end of said lower edge adjacent one end of the related group.

6. In a stone sawing machine, the combination of work carrying means, a saw sash disposed above said work carrying means, saw blades mounted parallelly in said sash, each of said blades having raked teeth extending along the lower edge thereof and divided into two groups, the teeth in one of said groups being oppositely raked relative to the teeth in the other of said groups, means supporting said saw sash for rocking about a transverse axis substantially in vertical alignment with the centers of said lower edges of the blades therein and for reciprocatory movement in a vertical plane parallel to said blades with said rocking axis following an upwardly concave arcuate path, and means for simultaneously reciprocating and rocking said saw sash, the last mentioned means being operative to rock said saw sash so that, during a reciprocating stroke thereof, the end portion of each of said blades, having teeth raked in the direction of said stroke, is lowered, while the other end portion of each of said blades is elevated.

7. In a stone sawing machine, the combination according to claim 6; including means for effecting relative vertical feeding movement of said cash and said work carrying means.

8. In a stone sawing machine, the combination according to claim 6; wherein the teeth in each of said groups are raked in the direction toward the end of said lower edge adjacent one end of the related group.

BROR G. STÅLHEIM.

REFERENCES CITED

The following references are of record in the file of this patent:

UNITED STATES PATENTS

| Number | Name | Date |
| --- | --- | --- |
| 32,711 | Parrish | July 2, 1861 |
| 337,661 | Campbell | Mar. 9, 1886 |
| 364,459 | Young | June 7, 1887 |
| 366,727 | Jenkinson | July 19, 1887 |
| 2,135,047 | Carpenter | Nov. 1, 1938 |
| 2,411,585 | Minkler et al. | Nov. 26, 1946 |

FOREIGN PATENTS

| Number | Country | Date |
| --- | --- | --- |
| 74,610 | Austria | Apr. 15, 1917 |